US 8,346,704 B2

(12) United States Patent
Hamadi et al.

(10) Patent No.: US 8,346,704 B2
(45) Date of Patent: Jan. 1, 2013

(54) CONTROLLED CONSTRAINT SHARING IN PARALLEL PROBLEM SOLVERS

(75) Inventors: Youssef Hamadi, Cambridge (GB); Said Jabbour, Villeneuve-d'Ascq (FR)

(73) Assignee: Microsoft Corporation, Redmond, WA (US)

(*) Notice: Subject to any disclaimer, the term of this patent is extended or adjusted under 35 U.S.C. 154(b) by 512 days.

(21) Appl. No.: 12/465,440

(22) Filed: May 13, 2009

(65) Prior Publication Data

US 2010/0293127 A1 Nov. 18, 2010

(51) Int. Cl.
*G06F 17/00* (2006.01)
*G06N 5/02* (2006.01)

(52) U.S. Cl. ........................................... 706/47
(58) Field of Classification Search .................. None
See application file for complete search history.

(56) References Cited

U.S. PATENT DOCUMENTS

| 5,546,594 | A | 8/1996 | Wazumi | |
| 7,472,094 | B2 | 12/2008 | Hamadi et al. | |
| 2008/0120490 | A1* | 5/2008 | Brown | 712/216 |
| 2008/0147573 | A1 | 6/2008 | Hamadi | |

OTHER PUBLICATIONS

Bohm et al. "A fast parallel SAT-solver—efficient workload balancing", Annals of Mathematics and Artificial Intelligence 17 (1996), pp. 381-400.*
Lvskb, "Dynamic Feedback Load Balancing Scheduling", 2006, pp. 5, http://kb.linuxvirtualserver.org/wiki/Dynamic_Feedback_Load_Balancing_Scheduling.*
Krajecki et al. "Parallel Tree Search for Combinatorial Problems: A Comparative Study Between OPENMP and MPI," SIU 2005, pp. 151-190.*
Audemard, et al., "A Generalized Framework for Conflict Analysis", in Proc. of SAT, 2008, pp. 21-27.
Blochinger, et al., "Parallel Propositional Satisfiability Checking with Distributed Dynamic Learning", Parallel Computing, 29(7), 2003, pp. 969-994.
Chiu, et al, "Analysis of the Increase and Decrease Algorithms for Congestion Avoidance in Computer Networks", Comp. Networks, 1989, 17: 1-14.
Chrabakh, et al., "GrADSAT: A Parallel SAT Solver for the Grid", UCSB Computer Science Technical Report No. 2003-05, 2003.
Chu, et al., "PMiniSat—A Parallelization of MiniSat 2.0", Technical Report, SATRace 2008, solver description, 2008.
Davis, et al., "A Machine Program for Theorem-Proving", Communications of the ACM, 5(7), 1962, 394-397.
Een, et al., "An Extensible SAT-Solver", In Proc. of SAT 2003. pp. 502-518, 2003.

(Continued)

*Primary Examiner* — Jeffrey A Gaffin
*Assistant Examiner* — Li-Wu Chang
(74) *Attorney, Agent, or Firm* — Zete Law, P.L.L.C.; MacLane C. Key

(57) ABSTRACT

Controlled constraint sharing in parallel problem solvers is described. In embodiments, constraint sharing in a problem solver is controlled by comparing a total number of shared constraints obtained in a time interval to a target, and regulating the subsequent number of shared constraints obtained from other problem solvers accordingly. Embodiments describe how the regulation of the subsequent number of shared constraints can be achieved by controlling the size of constraints shared by other problem solvers. Embodiments describe how an additive increase/multiplicative decrease algorithm can be used to determine the size of constraints to be exchanged. Embodiments also describe how the utility of the shared constraints can be determined, and used to control the size of constraints shared by other problem solvers. In embodiments, the problem solver is a Boolean satisfiability problem solver.

20 Claims, 7 Drawing Sheets

OTHER PUBLICATIONS

Gomes, et al., "Boosting Combinatorial Search through Randomization", in Proc. AAAI 1998, 1998, pp. 431-437.

Hamadi, et al., "ManySAT: A Parallel SAT Solver", Journal on Satisfiability, Boolean Modeling and Computation (JSAT), to appear, 2009.

Hamadi, et al., "ManySat: Solver Description", Technical Report MSR-TR-2008-83, Microsoft Research, May 2008.

Jacobson, et al., "Congestion Avoidance and Control", In Proc. SIGCOMM 1988, pp. 314-329, 1988.

Lewis, et al., "Multithreaded SAT Solving", In Proc. ASP DAC 2007.

Moskewicz, et al., "Chaff: Engineering and Efficient SAT Solver", In DAC 2001, pp. 530-535, 2001.

Silva, et al., "GRASP—A New Search Algorithm for Satisfiability", In Proc. of IEEE/ACM CAD 1996, pp. 220-227, 1996.

Cammarata, et al., "Strategies of Cooperation in Distributed Problem Solving", retrieved on Mar. 4, 2009 at <<http://dli.iiit.ac.in/ijcai/IJCAI-83-VOL-2/PDF/041.pdf>>, Rand Corporation, 4 pages.

Durfee, "Distributed Problem Solving and Planning", retrieved on Mar. 4, 2009 at <<http://www.isi.edu/~blythe/cs541/Readings/ACAI01.pdf>>, Weiss' MultiAgent Systems: A Modern Approach to Distributed Artificial Intelligence, Chapter 3, MIT Press 1999, pp. 1-34.

Langer, et al., "Using Distributed Problem Solving to Search the Web", retrieved on Mar. 4, 2009 at <<ftp://ftp.cs.huji.ac.il/users/jeff/aa2000langer.pdf>>, School of Engineering and Computer Science, Hebrew University, Jerusalem, Israel, 2 pages.

Schubert, et al., "PaMira-A Parallel SAT Solver with Knowledge Sharing", retrieved on Mar. 4, 2009 at <<http://ieeexplore.ieee.org/ielx5/4022212/4022213/04022225.pdf?tp=>>, Proceedings of the Sixth International Workshop on Microprocessor Test and Verification (MTV 2005), 6 pages.

Smith, et al., "Frameworks for Cooperation in Distributed Problem Solving", retrieved on May 13, 2009 at <<https://eprints.kfupm.edu.sa/41939/1/41939.pdf>>, IEEE Transactions on Systems, Man, and Cybernetics, vol. SMC-11, No. 1, Jan. 1981, pp. 61-70.

* cited by examiner

US 8,346,704 B2

CONTROLLED CONSTRAINT SHARING IN PARALLEL PROBLEM SOLVERS

BACKGROUND

Automated problem solvers are widely used in the resolution of complex, NP-difficult or NP-hard problems. Such problems arise frequently in industrial applications, for example planning, scheduling and configuration problems. Typical examples include supply chain optimization, planning delivery routes for goods, software verification, logistics of large conference scheduling, and data center energy profile management. An example of a problem solver engine is Microsoft™ Solver Foundation.

Such problems are defined in terms of variables and relations between the variables in the form of constraints. The problem solver searches for possible solutions by searching for values for all the variables that satisfy the constraints. The problem solver typically solves the problem by creating a tree data structure representing the variables, pruning the tree according to the constraints and searching the tree for a solution.

One of the characteristics of such problem solvers is a high runtime variance. This variance comes from the sensitivity of the resolution to the problem solver's parameters. Ideally, a problem solver is run with the optimum parameters for a given problem to ensure the shortest runtime and high overall performance. However, it is very difficult to know beforehand which parameters ought to be used with a particular problem. One way to address this is to run several parallel problem solvers with different parameters, such that the first problem solver to finish delivers the solution and stops the other search efforts.

Parallel problem solvers can also be used to improve performance by splitting up the tree in order to create a number of independent sub-problems. Each of these sub-problems can be solved in parallel, and ultimately combined together to provide the overall result. Parallel problem solvers have become increasingly used since the widespread adoption of multi-core processors.

When parallel problem solvers are being utilized (each either addressing the same problem with different parameters or addressing related sub-problems), the performance can be further improved by enabling the parallel problem solvers to exchange information on the search process. This is often called "knowledge sharing".

For example, problem solving algorithms can learn new constraints as the problem is solved, and add these new constraints to the ones defined by the user. The learning of new constraints makes the problem easier to solve. It is therefore useful to share these learnt constraints between the parallel problem solvers, so that the other problem solvers running in parallel also benefit from knowledge of these constraints.

However, the process of communicating the information between the problem solvers can slow down the resolution of the problem. This is because the process of selecting, exchanging and integrating information interrupts the search process, and is thus time consuming and causes overheads.

The embodiments described below are not limited to implementations which solve any or all of the disadvantages of known problem solvers.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Controlled constraint sharing in parallel problem solvers is described. In embodiments, constraint sharing in a problem solver is controlled by comparing a total number of shared constraints obtained in a time interval to a target, and regulating the subsequent number of shared constraints obtained from other problem solvers accordingly. Embodiments describe how the regulation of the subsequent number of shared constraints can be achieved by controlling the size of constraints shared by other problem solvers. Embodiments describe how an additive increase/multiplicative decrease algorithm can be used to determine the size of constraints to be exchanged. Embodiments also describe how the utility of the shared constraints can be determined, and used to control the size of constraints shared by other problem solvers. In embodiments, the problem solver is a Boolean satisfiability problem solver.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a parallel problem solver system, the system described is provided as an example and not a limitation. As those skilled in the art will appreciate, the present examples are suitable for application in a variety of different types of optimization systems.

Figure 1:
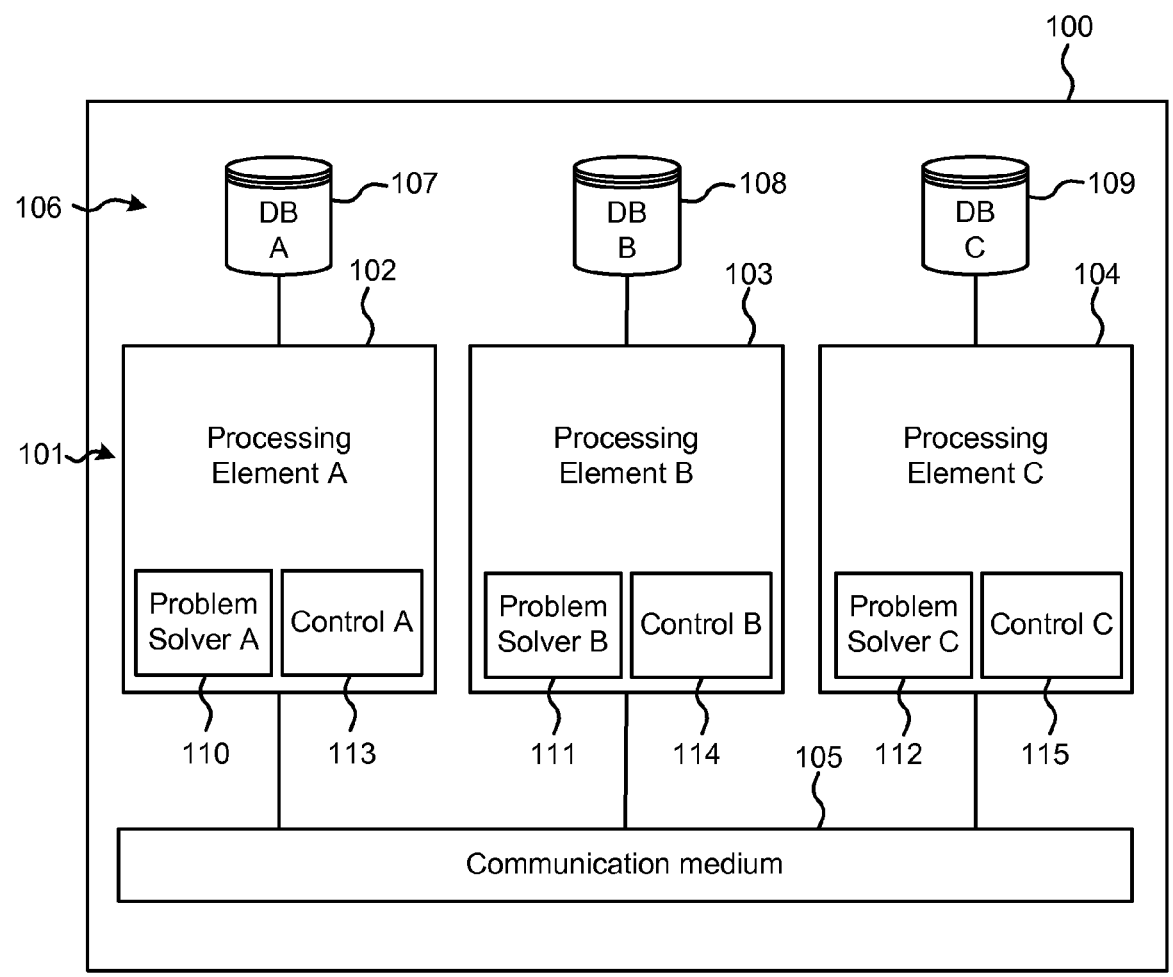
FIG. 1 illustrates a parallel problem solver apparatus.

FIG. 1 illustrates an example parallel problem solver apparatus 100 comprising a plurality of processing elements 101. In the example of FIG. 1, three processing elements are shown: processing element A 102, processing element B 103, and processing element C 104. In other examples, the parallel problem solver apparatus 100 can comprises a larger or smaller number of processing elements.

In one example, the plurality of processing elements 101 are fabricated on a single processor, in the form of a multi-core processor (i.e. each processing element corresponds to a core). Alternatively, the processing elements can be located on physically separate processors.

Each of the plurality of processing elements 101 is connected to a communication medium 105. The communication medium 105 enables each of the plurality of processing elements 101 to communicate with each other and exchange information. The communication medium can be in the form of a shared memory accessible by each of the plurality of processing elements 101. Alternatively, the communication medium 105 can be in the form of a system bus or data network. In the case of a data network, the plurality of processing elements 101 can be widely spaced apart geographically, if for example the data network is the internet.

The parallel problem solver apparatus 100 also comprises a plurality of storage elements 106. Each of the plurality of processing elements 101 is connected to one of the plurality of storage elements 106. For example, in the apparatus shown in FIG. 1, processing element A 102 is connected to storage element A 107, processing element B 103 is connected to storage element B 108, and processing element C 104 is connected to storage element C 109. Note that the plurality of storage elements 106 can in some examples be provided by a single physical device, for example a hard drive or memory with portions allocated to form each of the plurality of storage elements 106. Each of the plurality of storage elements 106 is arranged to store information from the associated processing element, for example in the form of a database.

Each of the plurality of processing elements 101 is executing a problem solver, which can be in the form of a software problem solver engine. In the example shown in FIG. 1, processing element A 102 is executing problem solver A 110, processing element B 103 is executing problem solver B 111, and processing element C 104 is executing problem solver C 112. These problem solvers are operating in parallel to solve a related problem or sub-problems of an overall problem. In one example, the problems solvers are Boolean satisfiability problem solvers. Such problem solvers are also known as SAT solvers. A SAT solver having a plurality of processing elements working on related problems or sub-problems is called a parallel SAT solver.

Each of the plurality of processing elements 101 is also executing a control algorithm. In the example shown in FIG. 1, processing element A 102 is executing control A 113, processing element B 103 is executing control B 114, and processing element C 104 is executing control C 115. The controls are arranged to regulate, control and manage information shared between the plurality of processing elements 101 executing problem solvers, as described in more detail hereinafter.

As mentioned above, the problem solvers (110, 111, 112) can learn useful information about the problem as it is solved. For example, the problem solvers can learn new constraints (also called clauses). When a problem solver executed on one of the plurality of processing elements 101 learns a new constraint, the new constraint can be shared with all the other processing elements in order to prune their search spaces. This simplifies the problem and increases performance.

Learnt constraints are stored in the storage element associated with the processing element that learnt the constraint. For example, if problem solver A 110 executed on processing element 102 learns a new constraint, then this is stored in storage element 107. Also, when a constraint is shared, it is provided to the other processing elements over the communication medium 105. Shared constraints are stored in the storage element associated with the processing element that received the shared constraint. For example, if problem solver A 110 executed on processing element 102 is sharing a newly learnt constraint, then this is sent over the communication medium 105 to processing element B 103 and C 104, and stored in storage element B 108 and C 109.

However, since the number of potential new learnt constraints is large, the systematic sharing of every learnt constraint is not feasible. The control algorithms are arranged to limit the number of shared constraints exchanged between the processing elements, such that the constraint sharing improves performance in the parallel problem solver, without unduly increasing overheads.

Figure 2:
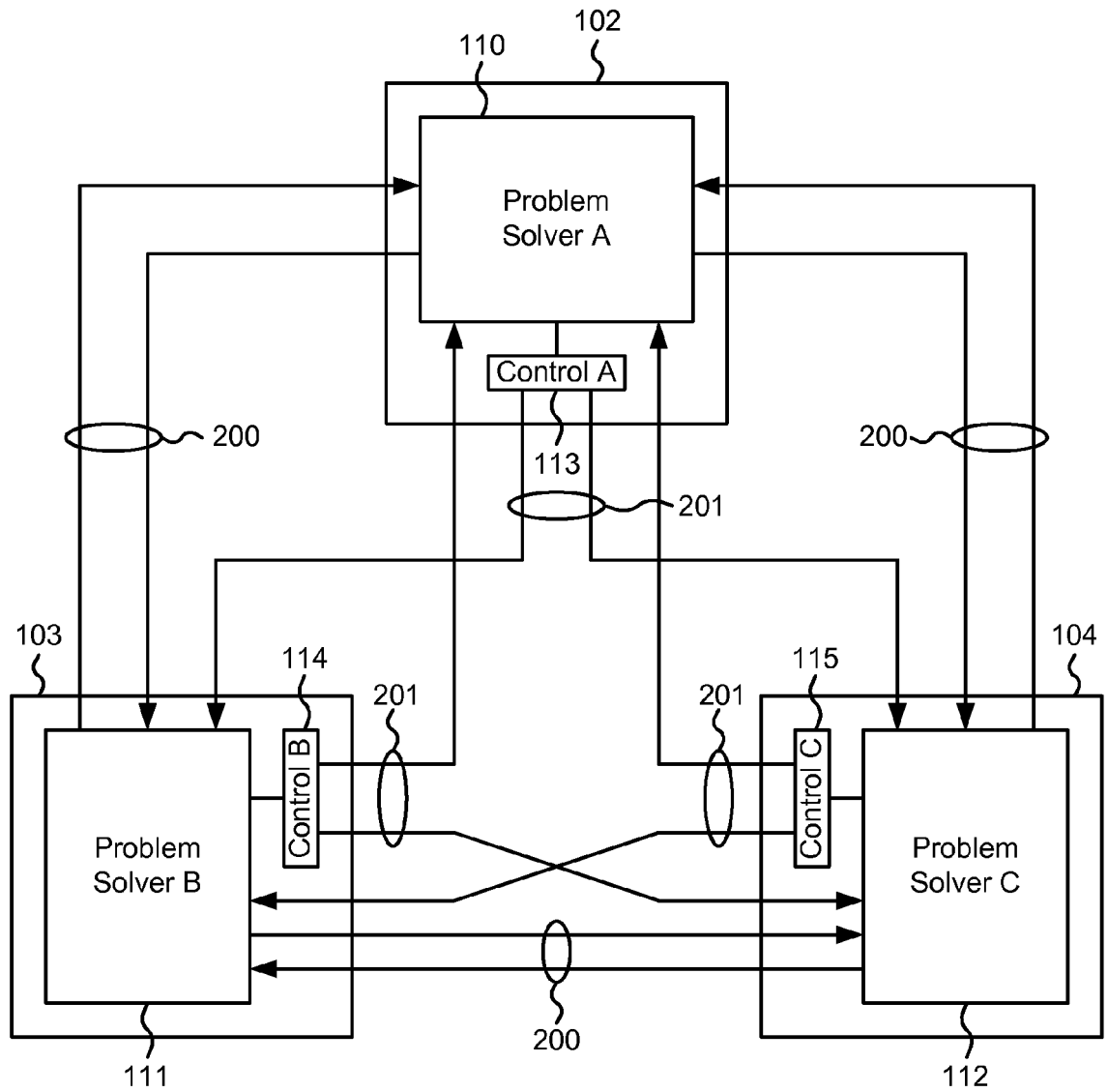
FIG. 2 illustrates communication between processing elements in a parallel problem solver.

Reference is now made to FIG. 2, which illustrates the information exchanged between the functional elements in the example scenario of FIG. 1. The example of FIG. 2 applies to the case of three processing elements, but can also be extended to more processing elements. The conceptual communication links between the processing elements shown in FIG. 2 happens over the communication medium 105, which is not shown in FIG. 2 for clarity.

Each problem solver can send learnt constraints to every other problem solver in the system, and can receive shared constraints from every other problem solver in the system. This is illustrated by communication links 200 in FIG. 2. The problem solvers are therefore fully interconnected. In addition, the control algorithm for each of the processing elements has an output provided to every other problem solver in the system, as shown by communication links 201.

Figure 3:
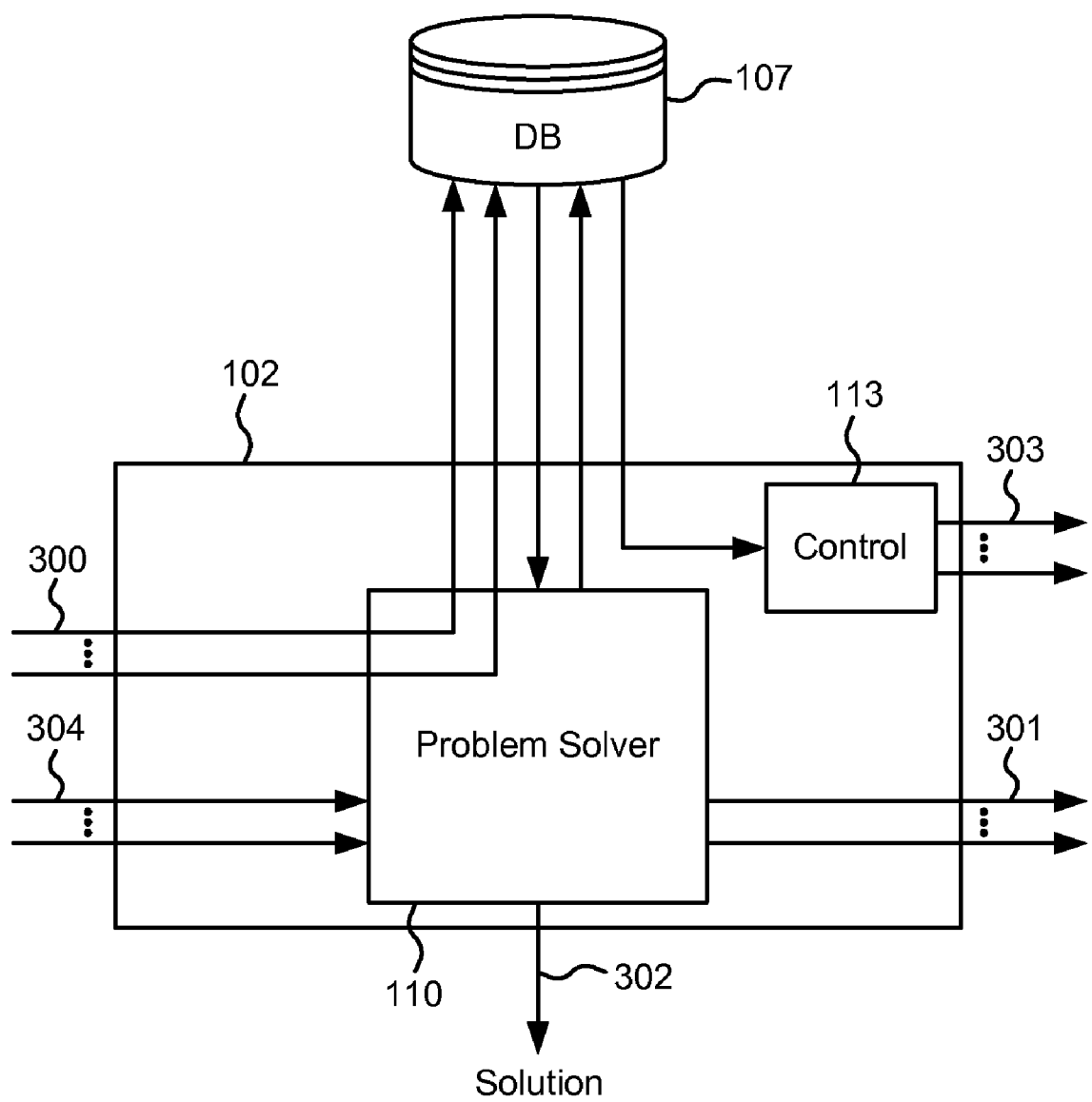
FIG. 3 illustrates a functional diagram of a processing element.

Reference is now made to FIG. 3, which illustrates a detailed functional diagram of one of the processing elements (in this instance processing element A 102). The problem solver 110 receives shared constraints 300 from each of the other processing elements and stores them in the storage element 107. In this example, the storage element 107 is configured as a constraint database. The problem solver 110 also learns constraints and stores them in the storage element 107, and, if appropriate, outputs learnt constraints 301 to other problem solvers. The process for determining whether to send a learnt constraint to another problem solver is described in more detail with reference to FIG. 4 below. Note that the examples in FIGS. 1, 2 and 3 comprise three processing elements, and therefore there are two inputs for shared constraints 300 and two outputs for learnt constraints 301 (one for each of the other problems solvers). In other examples there are more or less inputs and outputs in accordance with the number of other processing elements and problem solvers.

The problem solver 110 uses the constraints (both shared and learned) from the storage element 107, and eventually outputs a solution 302 to the problem. Whilst the problem solver 110 is working on the problem, the control 113 reads data relating to the shared constraints from the storage element 107 and generates a feedback parameter 303 for each of the other processing elements (described with reference to FIGS. 5 and 6). Additionally, a feedback input 304 is received from each of the other processing elements at the problem solver 110, and is used to control which learnt constraints are sent (described with reference to FIG. 4). As can be seen in FIG. 2, the feedback parameter output from a control algorithm in one processing element is the feedback input for another processing element, and vice versa. Note again that the examples in FIGS. 1, 2 and 3 comprise three processing elements, and therefore there are two feedback inputs 304 and two output feedback parameters 303 (one for each of the other problems solvers). In other examples there are more or less inputs and outputs in accordance with the number of other processing elements and problem solvers.

Therefore, each processing element 102 comprises a control 113 which is controlling the constraints that the processing element 102 is sending (learnt constraints 301) and receiving (shared constraints 300) from the other processing elements 103, 104. In other words, there is a pair-wise control of the exchange of constraints between any pair of processing elements. Each processing element 102 sets the feedback parameter 303 for each of the other processing elements 103, 104 in order to control how much information it gets, and each of the other processing elements 103, 104 are arranged to take into account this feedback parameter 303 when sending information.

The control of the exchange of constraints between the processing elements can be performed in a number of ways. For example, a target number of shared constraints from all other processing elements can be predefined, such that if the processing element 102 has not received the target number of shared constraints, then the feedback parameter 303 indicates to the other processing elements 103, 104 that constraints can be shared with this processing element 102. If the processing element 102 has received over the target number of shared constraints, then the feedback parameter 303 is changed to indicate to the other processing elements 103, 104 that they cannot share constraints with this processing element 102. In another example, the control of the exchange of constraints can be based on a determined quality metric for the constraints, such that only those constraints having a quality metric greater than a predefined threshold are exchanged.

In another example, the feedback parameter 303 controls the amount of information exchanged between the processing elements by setting a maximum size limit for received shared constraints. Each constraint comprises a number of variables, and the number of variables in the constraint determines its size. For example, if processing element A 102 outputs a feedback parameter 303 to processing element B 103 defining a size limit of 8, then processing element B 103 can be arranged to send learnt constraints having a size less than or equal to 8 to processing element A 102. Setting a maximum size limit for shared constraints therefore regulates the number of shared constraints, as a larger maximum size results in a larger number of shared constraints available to be sent, whereas, conversely, a smaller maximum size results in a smaller number of shared constraints available to be sent.

The feedback parameter 303 can define a pair-wise maximum size limit for the shared constraints, such that, for example, processing element A 102 sets a first maximum size limit for shared constraints from processing element B 103, and a second maximum size limit for shared constraints from processing element C 104.

Controlling the exchange of constraints on the basis of the constraint size helps to ensure that the exchange focuses on the most useful constraints. This is because short constraints are more powerful in terms of pruning the search tree. By controlling the size of constraints exchanged, it can therefore be ensured that if only a low number of constraints are being exchanged, then these are the most useful ones for the problem solver.

Figure 4:
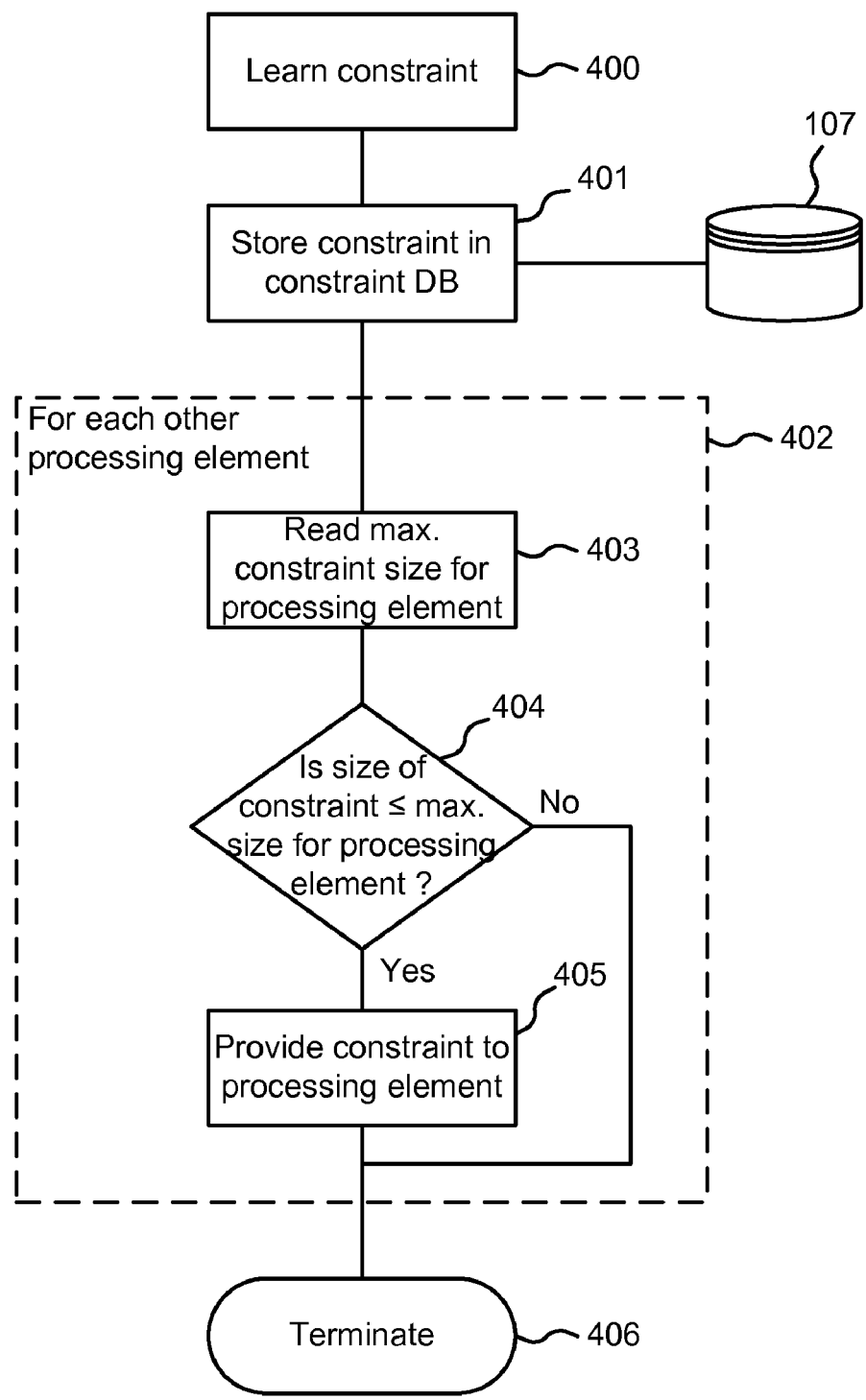
FIG. 4 illustrates a flowchart of a process for determining whether to share a constraint.

Reference is now made to FIG. 4, which illustrates a flowchart of a process for determining whether to send a learnt constraint based on its size. The process of FIG. 4 can be performed by the problem solver when a new constraint is learnt. This flowchart is explained from the point of view of processing element A 102 in FIG. 3, but is also performed by each of the processing elements in the system.

The process starts when the problem solver 110 learns 400 a new constraint. The newly learned constraint is stored 401 in the storage element 107. Then, sub-process 402 (shown with dashed lines in FIG. 4) is performed separately for each of the other processing elements in the system (i.e. in this example performed first for processing element B 103 and then again for processing element C 104). Firstly, for processing element B 103, the maximum constraint size for processing element B 103 is read 403. The maximum constraint size for processing element B 103 was provided to processing element A 102 in the feedback input 304 from processing element B 103 shown in FIG. 3. It is then determined 404 whether the newly learnt constraint has a size less than or equal to the maximum constraint size for processing element B 103.

If it is determined that the newly learnt constraint does have a size less than or equal to the maximum constraint size for processing element B 103, then the learnt constraint is provided 405 to processing element B 103 (via the learnt constraints 301 output shown in FIG. 3). On the other hand, if it is determined that the newly learnt constraint has a size greater than the maximum constraint size for processing element B 103, then the learnt constraint is not provided to processing element B 103.

The sub-process 402 is then performed again, this time for the remaining other processing element (i.e. processing element C 104). The maximum constraint size for processing element C 104 is read, and if the newly learnt constraint has a size less than or equal to the maximum constraint size for processing element C 104, then the newly learnt constraint is provided to processing element C 104. If more processing elements were present in the system, then sub-process 402 would be repeated more times, accordingly.

Once sub-process 402 has been repeated for all the other processing elements, then the process in FIG. 4 terminates 406. Therefore, as a result of the process in FIG. 4, it has been determined on an individual basis whether to provide a leant constraint to each of the processing elements in the system, depending on the individual feedback parameters from each of the processing elements. The process in FIG. 4 can be performed as soon as a new constraint is learned, performed periodically, or as a batch process once a predetermined number of constraints have been learned.

Figure 5:
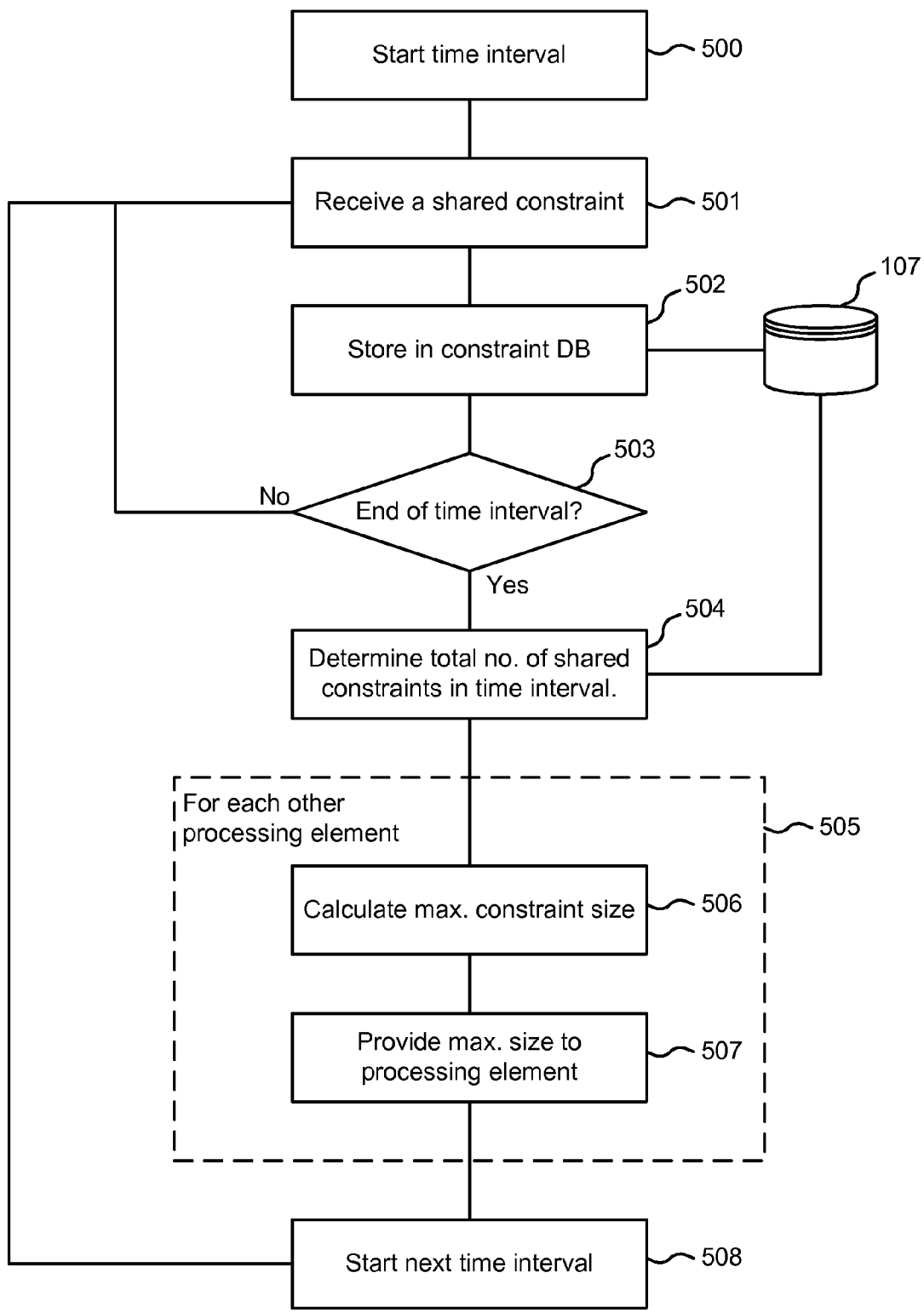
FIG. 5 illustrates a flowchart of a process for calculating a maximum constraint size for all processing elements.

Reference is now made to FIG. 5, which illustrates a process for calculating the maximum constraint size for each processing element. FIG. 5 is described from the perspective of processing element A 102 as shown in FIG. 3, but is additionally performed by each of the processing elements in the system.

The process in FIG. 5 begins with the processing element 102 starting 500 the timing of an interval. In one example, the interval time is a predetermined number of execution steps of the problem solver 110. A shared constraint is received 501 (via the shared constraints 300 input in FIG. 3) and this shared constraint is stored 502 in the storage element 107. The process of receiving and storing shared constraints is repeated until it is determined 503 that it is the end of the time interval. The total number of shared constraints from all the processing elements is then calculated 504 using the data stored in the storage element 107 (this value is used in the calculation illustrated in FIG. 6 hereinafter).

Sub-process 505 (shown with dashed lines in FIG. 5) is then performed separately for each of the other processing elements in the system (i.e. in this example performed first for processing element B 103 and then again for processing element C 104). Firstly, for processing element B 103, the maximum constraint size for processing element B 103 is calculated 506. An example algorithm for calculating the maximum constraint size is described hereinafter with reference to FIG. 6. The calculated maximum constraint size for processing element B 103 is then provided 507 to processing element B 102. This is provided as the feedback parameter 303 for processing element B 103, and applied for the next time interval.

The sub-process 505 is then performed again, this time for the remaining other processing element (i.e. processing element C 104). The maximum constraint size for processing element C 104 is calculated and provided to processing element C 104. If more processing elements were present in the system, then sub-process 402 would be repeated more times, accordingly.

Once sub-process 402 has been repeated for all the other processing elements, then the next time interval is started, and the process returns to receiving and storing shared constraints.

Figure 6:
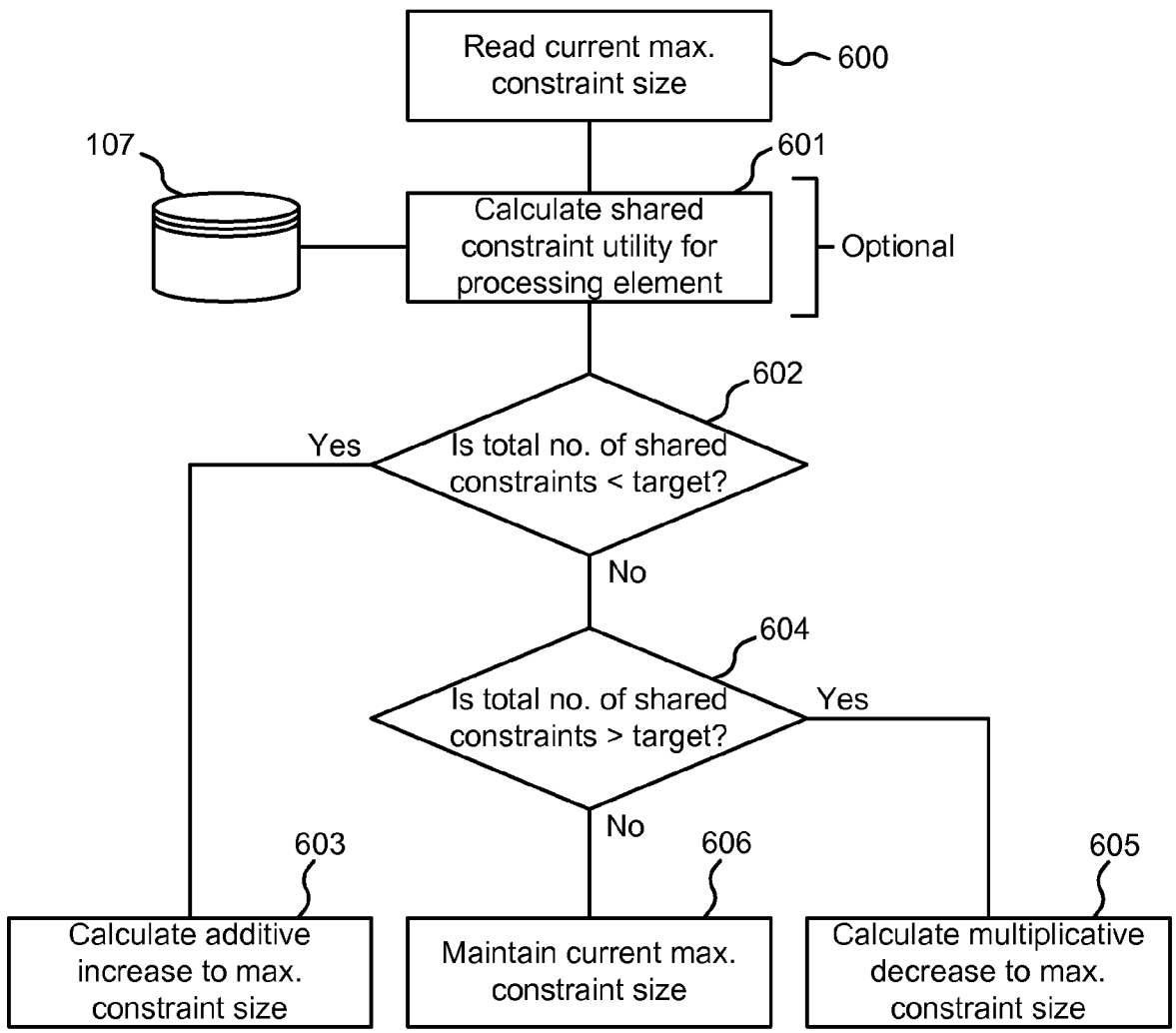
FIG. 6 illustrates a flowchart of a process for calculating a maximum constraint size for a given processing element.

Reference is now made to FIG. 6, which illustrates an example algorithm for calculating the maximum constraint size for a given processing element. The process of FIG. 6 is performed as part of the process of FIG. 5, as described above. The process of FIG. 6 is performed on a processing element and calculates the maximum constraint size for a particular one of the other processing elements. FIG. 6 is described from the perspective of processing element A 102 calculating the maximum constraint size of processing element B 103, but is also performed for all other combinations of processing elements in the system.

The process starts by reading 600 the current maximum constraint size for the processing element in question. For example, if the process in FIG. 6 is being performed by processing element A 102 to calculate the maximum constraint size for processing element B 103, then the current maximum constraint size for processing element B 103 is read. If this is the first time that the calculation has been performed, then a predefined starting value for the maximum constraint size is used.

Optionally, a value for the utility of the shared constraints from processing element B 103 is calculated 601. The utility is a measure of the quality or usefulness of the shared constraints provided by processing element B 103 to processing element A 102. In other words, this is a quantification of how beneficial to the problem solving the shared constraints from processing element B 103 have been. This can be measured by maintaining a record in the storage element 107 of the number of times each shared constraint is used by the problem solver 110 during the time interval in question. The utility can then be determined by calculating the proportion of time (e.g. in terms of problem solver execution steps) in which shared constraints from processing element B 103 were utilized.

In another example, the utility of the shared constraints from processing element B 103 can be calculated by monitoring which variables in the problem solver are active in the problem solving process. A maximal activity for the variables in the problem solver is known, and this can be compared to the activity of a given variable. A variable within a shared constraint can then be considered "active" if its activity is greater than or equal to a proportion (e.g. half) of the maximal activity. The algorithm then determines the number of shared constraints received from processing element B 103 in the time interval having at least a threshold number of "active" variables. The ratio of the number of shared constraints received from processing element B 103 in the time interval having at least a threshold number of "active" variables relative to the total number of constraints obtained from processing element B 103 in the time interval is then determined to give a value for utility.

The optional determination of utility of the shared constraints is utilized in the final calculation of the maximum constraint size, as described below.

It is then determined 602 whether the total number of constraints received from all the other processing elements (as calculated 504 in FIG. 5 above) is less than a target number. The target number is a predefined number of shared constraints that the processing element A 102 aims to receive in every time interval. In this way, the target number defines a throughput for the number of shared constraints that are desired by the processing element A 102 in the time interval. By defining a target number of shared constraints it can be ensured that the sharing of constraints continues throughout the problem solving process, but the amount shared can be limited, so as to avoid the overhead of excessive sharing. As stated before, because the size of the shared constraints is used to regulate the amount of shared constraints, it is ensured that the most useful, smaller constraints are focused on.

If the total number of constraints received from all the other processing elements is less than the target number, then an increase to the maximum constraint size for processing element B 103 is calculated 603, as described in more detail presently. If, however, the total number of constraints received from all the other processing elements is not less than the target number, then it is determined 604 whether the total number of constraints received from all the other processing elements is more than the target number.

If the total number of constraints received from all the other processing elements is more than the target number, then a decrease in the maximum constraint size for processing element B 103 is calculated 605, as is described in more detail presently. If however, the total number of constraints received from all the other processing elements is not more than the target number, then this means that the total number of constraints received from all the other processing elements is equal to the target number, and in this case the current maximum constraint size for processing element B is maintained unchanged.

In order to calculate the increase or decrease to the current maximum constraint size (as calculated in 603 and 605), simple increments and decrements can be used, respectively. Alternatively, in another example, the additive increase/multiplicative decrease (AIMD) algorithm can be used. The AIMD algorithm is a feedback control algorithm which increases a value linearly and decreases a value exponentially.

The AIMD algorithm increases the maximum constraint size by adding the current maximum constraint size to a constant value (b) divided by the current maximum constraint size. The AIMD algorithm decreases the maximum constraint size by subtracting the current maximum constraint size multiplied by a constant value (a) from the current maximum value.

The AIMD algorithm can therefore be represented as follows:

$$e_{B \to A}^{k+1} = \begin{cases} e_{B \to A}^k + \dfrac{b}{e_{B \to A}^k} & \text{if } R < T \\ e_{B \to A}^k - a \times e_{B \to A}^k & \text{if } R > T \end{cases}$$

where: k is the current time interval; k+1 is the next time interval; $e_{B \to A}^k$ is the current (i.e. in interval k) maximum constraint size for constraints sent from processing element B 103 to A 102; $e_{B \to A}^{k+1}$ is the maximum constraint size for constraints sent from processing element B 103 to A 102 in the next time interval; T is the target number; R is the total number of shared constraints from all processing elements received in interval k; a is a positive constant; and b is a positive constant. In one example, a=0.125 and b=8.

The utility value optionally calculated previously can also be included in the AIMD algorithm. If the utility value is a number between zero and one, then the calculation of the maximum constraint size is found as follows:

$$e_{B \to A}^{k+1} = \begin{cases} e_{B \to A}^k + Q_{B \to A}^k \times \dfrac{b}{e_{B \to A}^k} & \text{if } R < T \\ e_{B \to A}^k - (1 - Q_{B \to A}^k) \times a \times e_{B \to A}^k & \text{if } R > T \end{cases}$$

Where: $A_{B \to A}^k$ is the utility of shared constraints sent from processing element B 103 to A 102 in interval k.

By including the utility value in the AIMD algorithm, the extent of the change in the maximum constraint size depends on how useful previous shared constraints were from the processing element in question. A high value (close to one) for the utility maximizes an increase or minimizes a decrease, whereas a low value (close to zero) for the utility minimizes an increase or maximizes a decrease.

Since any increase in the maximum constraint size limit can potentially generate a large number of shared constraints, the AIMD algorithms slow (linear) increase helps to avoid a rapid overshoot of the target number. Similarly, in the case of an overshoot of the target number occurring, the AIMD algorithm's rapid (exponential) decrease in the maximum constraint size helps to quickly reduce the number of shared constraints.

In summary, because the above processes in FIGS. 4-6 are performed independently by each of the processing elements in the parallel problem solver system, and each of the processing elements are individually controlling the amount (and optionally the quality) of the constraints that it receives from the other processing elements, the performance of the problem solver can be improved by ensuring that the shared constraints it receives are useful and not excessive in quantity.

Figure 7:
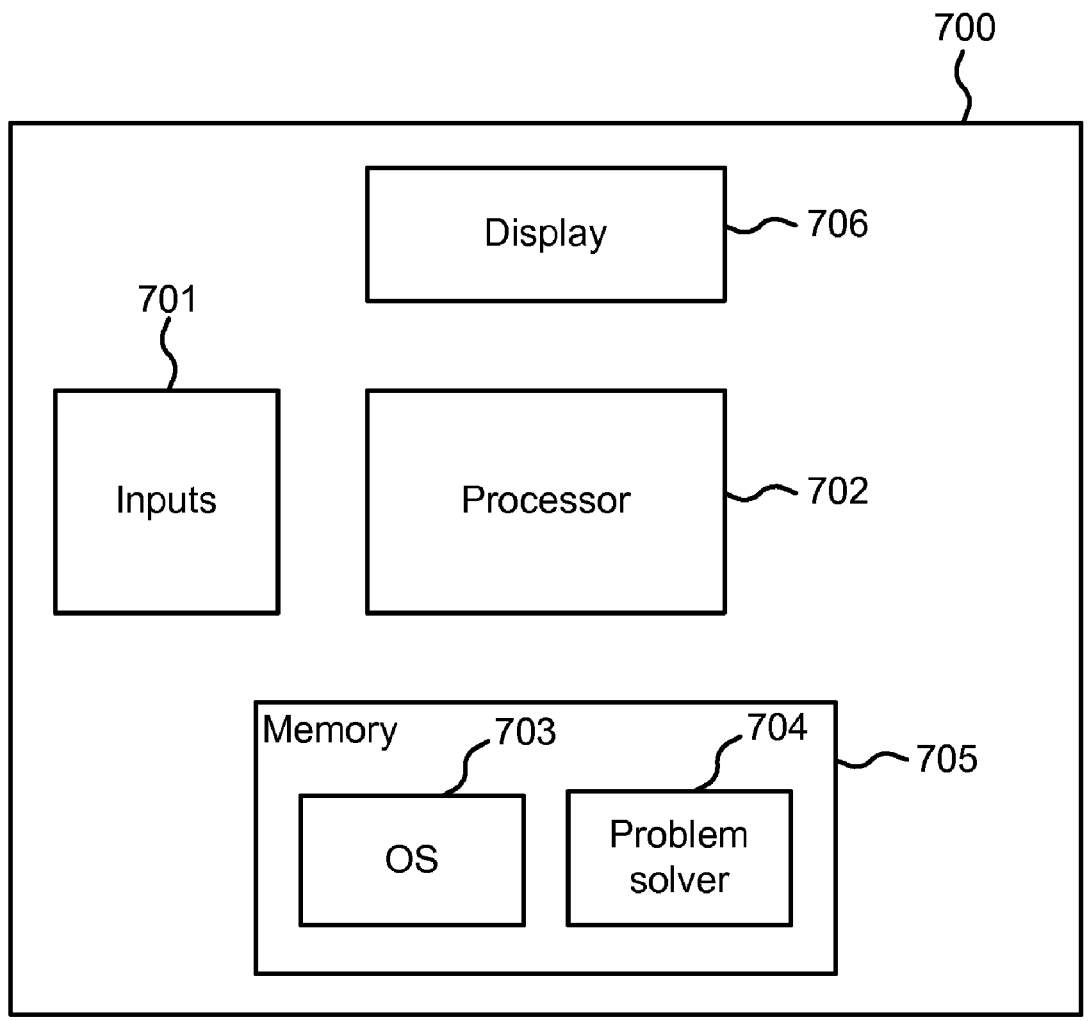
FIG. 7 illustrates an exemplary computing-based device in which embodiments of a parallel problem solver can be implemented.

FIG. 7 illustrates various components of an exemplary computing-based device 700 which can be implemented as any form of a computing and/or electronic device, and in which embodiments of the parallel problem solver can be implemented.

The computing-based device 700 comprises one or more inputs 701 which are of any suitable type for receiving a problem definition and parameters from a user. This can be in the form of a user input device such as a keyboard and pointing device, or a communication interface for receiving data.

Computing-based device 700 also comprises one or more processors 702 which can be microprocessors, controllers or any other suitable type of processors for processing computing executable instructions to control the operation of the device in order to perform parallel problem solving. Platform software comprising an operating system 703 or any other suitable platform software can be provided at the computing-based device to enable problem solver software 704 to be executed on the device.

The computer executable instructions can be provided using any computer-readable media, such as memory 705. The memory is of any suitable type such as random access memory (RAM), a disk storage device of any type such as a magnetic or optical storage device, a hard disk drive, or a CD, DVD or other disc drive. Flash memory, EPROM or EEPROM can also be used.

An output 706 is also provided such as an audio and/or video output to a display system integral with or in communication with the computing-based device. The display system can provide a graphical user interface, or other user interface of any suitable type although this is not essential.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or substantially simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of controlling constraint sharing in a problem solver executed on a processing element, comprising:
   receiving a set of shared constraints from a further problem solver executed on a further processing element during a time interval, wherein the set of shared constraints comprises one or more constraints on a solution to a common problem being solved by the problem solver and the further problem solver in parallel;
   determining a total number of shared constraints received at the problem solver during the time interval;
   comparing the total number of shared constraints received during the time interval to a target number of shared constraints and determining a feedback parameter for the further problem solver in dependence thereon, wherein the feedback parameter regulates a total number of constraints in a subsequent set of constraints received from the further problem solver in a subsequent time interval; and
   providing the feedback parameter to the further problem solver.

2. A method according to claim 1, wherein the feedback parameter comprises a maximum size of constraints in the subsequent set of constraints received from the further problem solver in the subsequent time interval.

3. A method according to claim 2, wherein, if the comparing determines that the total number of shared constraints is less than the target number of shared constraints, the maximum size of constraints is increased relative to a previous value.

4. A method according to claim 3, wherein the maximum size is increased linearly.

5. A method according to claim 2, wherein, if the comparing determines that the total number of shared constraints is more than the target number of shared constraints, the maximum size of constraints is decreased relative to a previous value.

6. A method according to claim 5, wherein the updating the maximum size decreases the maximum size exponentially.

7. A method according to claim 2, wherein the maximum size is determined using an additive increase, multiplicative decrease algorithm.

8. A method according to claim 2, further comprising determining a utility value for the set of shared constraints, and wherein the maximum size is determined in dependence on the utility value.

9. A method according to claim 8, wherein the utility value is defined by the number of times each constraint in the set of shared constraints is utilized by the problem solver in the time interval.

10. A method according to claim 8, wherein the utility value is defined by a ratio of a count of shared constraints in the set of shared constraints having at least a threshold number of active variables relative to a total number of constraints in the set of shared constraints.

11. A method according to claim 1, wherein the set of shared constraints are utilized by the problem solver to prune a search tree used by the problem solver to solve a problem.

12. A method according to claim 1, further comprising receiving a plurality of additional sets of shared constraints from a plurality of additional problems solvers executed on additional processing elements during the time interval, and the determining the total number of shared constraints received at the problem solver during the time interval comprises determining a union of the set of shared constraints and the plurality of additional sets of shared constraints and determining the number of constraints in the union.

13. A method according to claim 1, further comprising setting an initial maximum size, and wherein the set of shared constraints comprise constraints having a size less than the initial maximum size.

14. A problem solver apparatus, comprising:
   a plurality of processing elements each executing a problem solver;
   a communication medium arranged to connect each of the plurality of processing elements;
   a plurality of storage elements each arranged to store data from a respective one of the plurality of processing elements;
   wherein each of the plurality of processing elements is arranged to store shared constraints obtained from other ones of the plurality of processing elements via the communication medium in one of the plurality of storage elements, analyze the shared constraints obtained from the other processing elements, and provide a parameter to each of the other processing elements via the communication medium, the parameter controlling a property of subsequent shared constraints from each of the other processing elements; and
   the shared constraints obtained from the other processing elements include one or more constraints on a solution to a common problem being solved by the processing elements in parallel.

15. A problem solver apparatus according to claim 14, wherein each of the plurality of processing elements is solving at least a portion of a common problem.

16. A problem solver apparatus according to claim 14, wherein the property is the size of subsequent shared constraints.

17. A method of controlling constraint sharing in a parallel Boolean satisfiability problem solver executed on a processing element, comprising:
   receiving a set of shared constraints from a further problem solver executed on a further processing element during a time interval;
   determining a total number of shared constraints received at the problem solver during the time interval;
   comparing the total number of shared constraints received during the time interval to a target number of shared constraints and determining a feedback parameter for the further problem solver in dependence thereon, wherein the feedback parameter regulates a total number of constraints in a subsequent set of constraints received from the further problem solver in a subsequent time interval by setting a maximum size of constraints in the subsequent set of constraints; and
   providing the feedback parameter to the further problem solver.

18. A method according to claim 1, wherein the one or more constraints of the set of shared constraints are learned by the further problem solver as the common problem is being solved.

19. A problem solver apparatus according to claim 14, wherein the shared constraints obtained from the other processing elements include one or more constraints that are learned by one or more of the other processing elements as the common problem is being solved.

20. A method according to claim 17, wherein the set of shared constraints comprises one or more constraints on a common problem being solved by the problem solver and the further problem solver in parallel and that are learned by the further problem solver as the common problem is being solved.

\* \* \* \* \*